United States Patent [19]
DeJule et al.

[11] Patent Number: 5,317,445
[45] Date of Patent: May 31, 1994

[54] OPTICAL DEVICE WITH SPATIAL LIGHT MODULATORS FOR SWITCHING POLARIZED LIGHT

[75] Inventors: Michael C. DeJule, Clifton Park, N.Y.; Thomas L. Credelle, Los Gatos, Calif.

[73] Assignee: General Electric Company, Schenectady, N.Y.

[21] Appl. No.: 991,607

[22] Filed: Dec. 16, 1992

[51] Int. Cl.$^5$ .................... G02F 1/03; G02F 1/1335; G02F 1/29
[52] U.S. Cl. ..................... 359/250; 359/40; 359/107; 359/254; 359/316
[58] Field of Search ............... 359/40, 94, 250, 251, 359/252, 254, 316, 320, 107

[56] References Cited

U.S. PATENT DOCUMENTS

| | | | |
|---|---|---|---|
| 3,501,640 | 3/1970 | Harris | 359/250 |
| 4,124,278 | 11/1978 | Grinberg et al. | 359/40 |
| 4,410,238 | 10/1983 | Hanson | 350/347 E |
| 4,461,543 | 7/1984 | McMahon | 350/383 |
| 4,592,004 | 5/1986 | Bocker et al. | 359/107 |
| 4,740,061 | 4/1988 | Miura | 359/316 |
| 5,004,309 | 4/1991 | Caulfield et al. | 359/107 |
| 5,013,140 | 5/1991 | Healey et al. | 350/347 E |
| 5,071,231 | 12/1991 | Armitage et al. | 359/40 |
| 5,251,049 | 10/1993 | Sato et al. | 359/40 |

FOREIGN PATENT DOCUMENTS 0100993 5/1937 Australia .................... 359/250

OTHER PUBLICATIONS

"Switched Holograms for Reconfigurable Optical Interconnection: Demonstration of a Prototype Device", J. Barry McManus, Roger S. Putnam and H. John Caulfield. Applied Optics, vol. 27, No. 20, Oct. 15, 1988, pp. 4244-4250.

"Two-Dimensional Optical Architecture for Time-Delay Beam Forming in a Phased-Array Antenna", D. Dolfi, F. Michael-Gabriel, S. Bann, and J. P. Huignard. Optics Letters, vol. 16, No. 4, Feb. 15, 1991, pp. 255-257.

Primary Examiner—Loha Ben
Assistant Examiner—Evelyn A. Lester
Attorney, Agent, or Firm—Marvin Snyder

[57] ABSTRACT

An optical switching device for switching linearly polarized optical signal beams includes a plurality of switching cells arranged in matrix form. Each switching cell has spatial light modulators and a polarizing beamsplitter which cooperate to propagate the optical beams received by the device to selected output ports. The device can be three-dimensionally expanded to increase the number of output ports to which the optical beams can be selectively switched, in which case the matrices can share integrally constructed polarizing beamsplitters and SLMs.

16 Claims, 3 Drawing Sheets

OPTICAL DEVICE WITH SPATIAL LIGHT MODULATORS FOR SWITCHING POLARIZED LIGHT

BACKGROUND OF THE INVENTION

This invention relates to an optical switching device and, more particularly, to an electrically controlled switching device for individually directing a plurality of linearly polarized optical beams to selected output ports.

Signal processing systems often employ multiple parallel processors which permit many operations to take place concurrently. These so called parallel processing architectures typically require switching devices capable of efficiently transferring the data signals between such parallel processors. It is particularly advantageous to use optical switching devices to selectively interconnect the multiple parallel processors. For example, optical signal beams provide greater operating bandwidths and superior immunity to electro-magnetic interference as compared with electrical signals.

These optical switching devices must be capable of spatially switching large numbers of light beams while preserving the integrity of the signals communicated by such light beams. One approach generally used in the fabrication of these switching devices is to utilize a plurality of elementary switching cells which in combination provide the overall switching capacity of the device. In these switching devices, it is highly desirable to reduce the number of elementary switching cells required to switch a given number of light beams so that, for instance, the switching device becomes more compact while having lower fabrication costs.

An optical device for switching light beams is proposed by J. B. McManus, R. S Putnam, and H. J. Caulfield in the paper entitled "Switched holograms for reconfigurable optical interconnection: demonstration of a prototype device", Vol 27, Applied Optics, pp. 4244–4250, Oct. 15, 1988. The device proposed by McManus utilizes a plurality of switching cells arranged in a two-dimensional matrix which, in general, can have M columns and N rows of switching cells. Each switching cell comprises a polarizing beamsplitter and a spatial light modulator (SLM) which cooperate to selectively direct light beams externally applied to the matrix to selected outputs. A disadvantage of the device proposed by McManus is that light beams are received only by a single SLM and consequently the switching capacity of the McManus device is restricted to the number of light beams which can be handled by the single SLM. In contrast, a switching device of the same size (e.g., having MxN switching cells) but capable of receiving light beams at each of N SLMs provides an increased switching capacity (here increased by an N factor) over the McManus device. Moreover, the device proposed by McManus is confined to a two-dimensional arrangement of switching cells (e.g., a single two-dimensional switching matrix). In other words, McManus does not suggest how his device can be expanded into a three-dimensional arrangement of switching cells (e.g., a succession of identical two-dimensional matrices positioned parallel to each other). A device having such three-dimensional expansion capability significantly increases the universe of selectable output ports to which the light beams can be switched. For example, if Q is the number of successive two-dimensional matrices positioned parallel to each other, then the number of selectable output ports will increase by a Q factor.

Accordingly, one object of the invention is to provide a two-dimensional optical switching device which can individually and simultaneously direct light beams received by each of multiple SLMs thereof.

Another object of the present invention is to provide an optical switching device which can be three-dimensionally expanded to provide additional selectable output ports for the light beams switched by the device.

SUMMARY OF THE INVENTION

In accordance with the invention, an optical switching device capable of simultaneously and individually directing a plurality of externally derived linearly polarized optical signal beams to a selected plurality of output ports is provided. The device comprises at least a first switching matrix which includes a plurality $M \times N$ of switching cells arranged in M columns and N rows. Each switching cell comprises first and second spatial light modulators (SLMs) for operating on optical beams passing through the cell. Each of the SLMs includes an array of individually controllable pixels patterned so that each pixel is capable of receiving a single optical beam. Each first SLM of a cell in the first column of the matrix is positioned to receive a portion of the externally derived optical beams. In a reverse mode of operation, each second SLM in the last row of the matrix is also capable of receiving a portion of the externally derived optical beams. Each first SLM in a column subsequent to the first column is positioned to receive or to pass optical beams with respect to a cell located in a preceding column of the same row. Each second SLM in a row preceding the last row is positioned to receive or to pass optical beams with respect to a cell located in the subsequent row of the same column. Individual control signals applied to each pixel allow it to selectively rotate the polarization orientation of the optical beam passing through the pixel by up to at least 90°.

Each cell further comprises a polarizing beamsplitter which is optically coupled to receive optical beams from the first SLM of the same cell and from the second SLM of a cell located in a preceding row of the same column. In the reverse mode of operation, such beamsplitter is optically coupled to receive optical beams from the second SLM of the same cell and from the first SLM of a cell located in the subsequent column of the same row. In either mode, each beamsplitter permits optical beams received with a first selected linear polarization orientation to pass therethrough undeflected but causes optical beams received with a second selected linear polarization orientation to be deflected by an angle, for example 90°. Thus, the SLMs and the beamsplitter of each switching cell cooperate, under the direction of the control signals, to propagate through the matrix the externally derived optical beams applied simultaneously to the first column or to the last row of the matrix so as to reach selected output ports without mutual interference.

In one embodiment of the invention the switching device comprises a succession of identical switching matrices identified by alternate odd and even numbers. Each of the matrices is positioned in parallel alignment with each other across a common axis perpendicular to their rows and columns. In this embodiment, row reflecting means is capable of optically coupling each pair of consecutive matrices in which an odd numbered matrix (hereinafter "odd matrix") is followed by an even numbered matrix, (hereinafter "even matrix") and column reflecting means is capable of optically coupling each pair of consecutive matrices in which an even matrix is followed by an odd matrix. In accordance with this embodiment, in each cell of an odd matrix the SLMs and the beamsplitter cooperate to propagate optical beams through the odd matrix in ascending column order within a row and in ascending row order within a column, while in each cell of an even matrix the SLMs and beamsplitters cooperate to propagate signal beams through the even matrix in descending row order within a column and in descending column order within a row.

In another aspect of the invention, the polarizing beamsplitter of each switching cell is capable of splitting a received optical beam, according to its polarization orientation, into two mutually orthogonal beams. In accordance with this aspect of the invention, each of the externally derived optical signal beams can be simultaneously directed to at least two selected output ports.

BRIEF DESCRIPTION OF THE DRAWINGS

The features of the invention believed to be novel are set forth with particularly in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
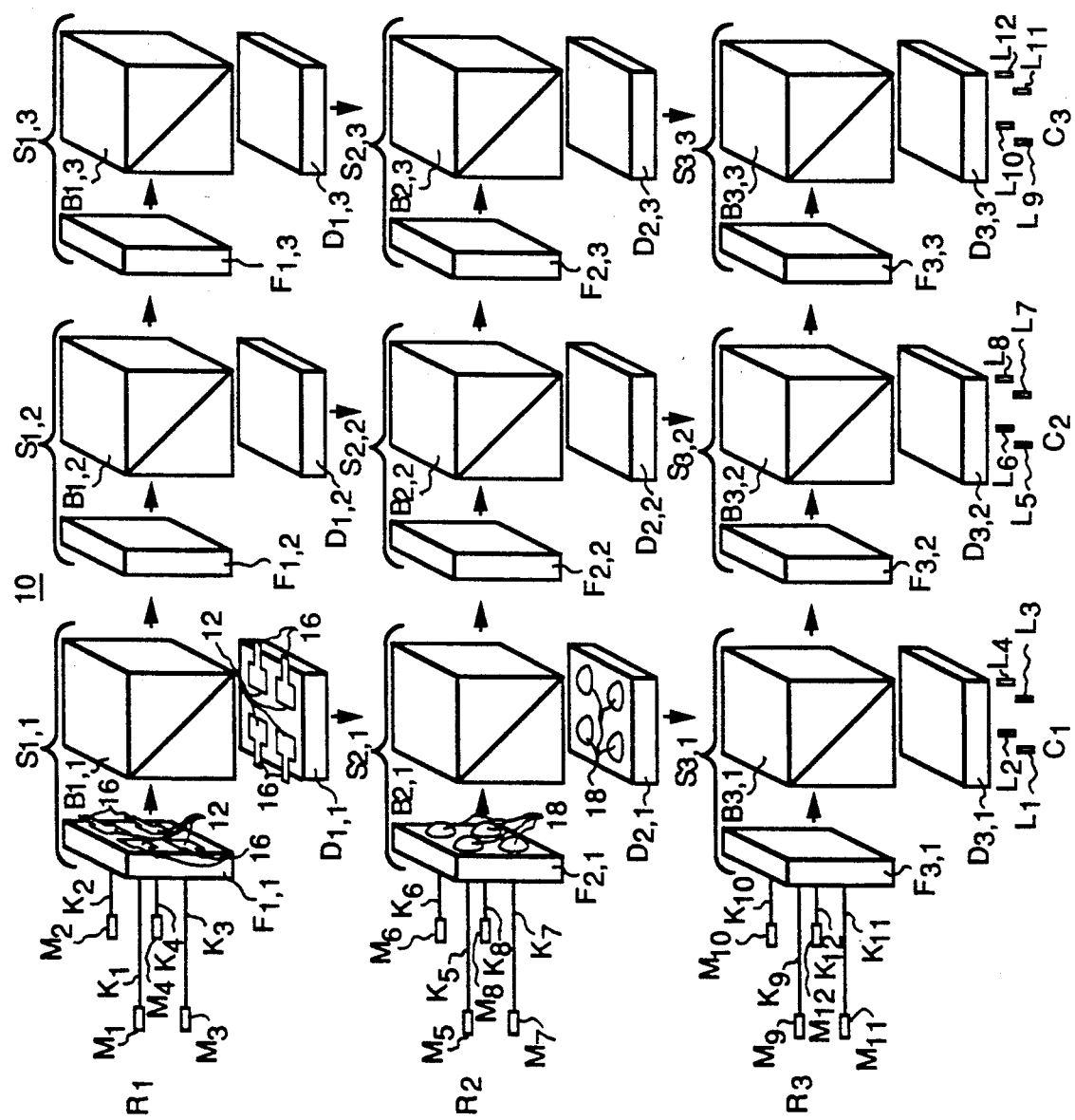
FIG. 1 is a schematic perspective view of an optical switching device in accordance with an embodiment of the present invention.

FIG. 1 shows an optical switching device 10 capable of simultaneously and individually directing a plurality of externally derived linearly polarized optical signal beams $K_1-K_{12}$ to a selected plurality of output ports $L_1-L_{12}$. As illustrated in FIG. 1, switching device 10 comprises nine switching cells $S_{1,1}$, $S_{1,2}$, ... $S_{3,3}$ arranged to form a two-dimensional switching matrix having three columns $C_1-C_3$ and three rows $R_1-R_3$. In general, $S_{i,j}$ identifies a switching cell located in the $i^{th}$ row and the $j^{th}$ column of a switching matrix comprising a plurality $M \times N$ of switching cells arranged in M columns and N rows.

Each switching cell $S_{i,j}$ comprises first and second spatial light modulators (SLMs) labelled $F_{i,j}$ and $D_{i,j}$ respectively. The first and second SLMs of any given cell are positioned at an angle to each other (e.g., 90°) such that, for example, first SLM $F_{i,j}$ operates on optical beams passing through the cell parallel to the rows of the matrix whereas second SLM $D_{i,j}$ operates on optical beams passing through the cell parallel to the columns of the matrix. Each SLM includes a two-dimensional array of individually controllable pixels 12 (shown only in the SLMs of switching cell $S_{1,1}$) patterned such that corresponding pixels in a row of cells are aligned with each other along that row, and corresponding pixels in a column of cells are aligned with each other along that column. The pixelated SLMs shown in FIG. 1 illustrate only four pixels per array for simplicity of illustration. It should be appreciated by those skilled in the art, however, that the pixel array in each SLM typically includes many pixels, for example, in the order of $10^4$ pixels per cm$^2$. Each pixel comprises a material capable of altering the polarization orientation of linearly polarized light passing therethrough. For explanatory purposes, and not by way of limitation, it will be assumed that each pixel comprises a twisted nematic liquid crystal (LC) material. It will be understood by those skilled in the art that other materials will be equally effective as polarization rotators (e.g., materials exhibiting the property known as the Faraday effect or ferroelectric smectic LCs). Alternatively, a linear nematic LC (i.e., untwisted) acting as a half-wave retarder can be used to rotate the polarization of light. As seen in the pixelated SLMs shown in FIG. 1, individual electrodes 16 coupled to a control computer (not shown) provide means for receiving and applying an individual control signal to each pixel of the first and second SLMs. The LC in each pixel may operate so that when the control signal applied thereto has a zero voltage the molecular orientation of the LC has a helical twist angle of 90°. In this twisted mode of operation, the molecular orientation of the LC causes a 90° rotation to the polarization orientation of the optical beam passing through the pixel. When the control signal applied to the pixel reaches a maximum voltage, the molecular orientation of the LC aligns approximately parallel to the optical beam passing therethrough and thus the optical beam passing through the pixel does not experience a polarization rotation. Thus, each pixel in the SLMs is individually controlled by the control signal applied thereto to selectively rotate or not the polarization orientation of the optical beam passing therethrough.

As seen in FIG. 1, each first SLM $F_{1,1}$, $F_{2,1}$ and $F_{3,1}$ in the first column of cells $C_1$ is positioned to receive a portion of the externally derived optical signal beams $K_1-K_{12}$ such that each pixel thereof receives a respective one of optical beams $K_1-K_{12}$. The arrows in FIG. 1 point in possible directions in which the optical beams applied to the first column of cells can be selectively directed through the switching matrix by way of its individual switching cells. As indicated by the arrows in FIG. 1, and as will be explained in greater detail, optical beams applied to the first column of cells can be selectively directed through the switching matrix in ascending column order within a row and in ascending row order within a column so that externally applied optical beams reach selected output ports $L_1-L_{12}$ associated with the last row of switching cells (here $R_3$). In a reverse mode of operation, externally derived optical signal beams can be applied to each second SLM $D_{3,1}$, $D_{3,2}$ and $D_{3,3}$ in the last row of cells $R_3$ which beams can be selectively directed through the switching matrix in descending row order within a column and in descending column order within a row (i.e., in directions opposite to the arrows shown in FIG. 1) so as to reach selected ports $M_1-M_{12}$ associated with the first column of cells.

Each cell $S_{i,j}$ further comprises a polarizing beamsplitter $B_{i,j}$ which is optically coupled to receive optical beams from the first rotator of the same cell $F_{i,j}$ and from the second rotator of a cell located in a preceding row of the same column $D_{i-1,j}$. In the reverse mode of operation, beamsplitter $B_{i,j}$ is optically coupled to receive optical beams from the second rotator of the same cell $D_{i,j}$ and from the first rotator of a cell located in the subsequent column of the same row $F_{i,j+1}$. As used herein, "optically coupled" refers to an arrangement in which one or more optical beams are directed from one optical component to another in a manner which maintains the integrity of the signal carried by the optical beams. In either mode of operation, beamsplitter $B_{i,j}$ permits optical beams received with a first selected linear polarization orientation (e.g. parallel to the plane of the figure) to pass through undeflected, while optical beams received with a second selected linear polarization orientation (e.g. perpendicular to the plane of the figure) are deflected by 90°. Preferably, each pixel array in the switching cells is associated with a respective array of focusing lenses 18 (shown only in cell $S_{2,1}$) disposed so that each focusing lens is optically coupled to a respective one of the pixels to minimize crosstalk between optical beams passing through the cell.

Figure 2:
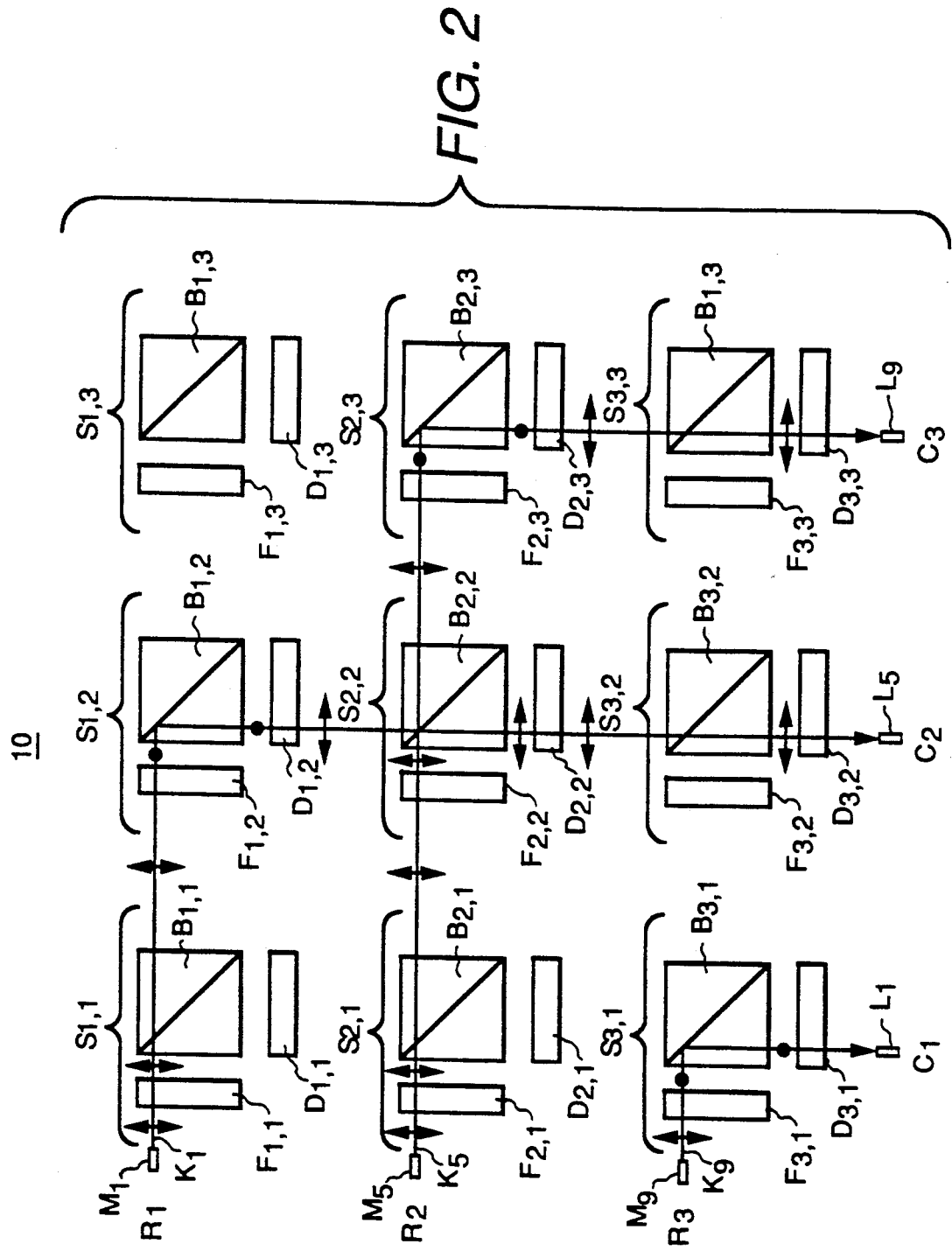
FIG. 2 is a schematic front elevation view of the optical switching device shown in FIG. 1.

FIG. 2 illustrates the operation of the switching matrix of FIG. 1 in the context of optical signal beams $K_1$, $K_5$ and $K_9$ received, respectively, by first SLMs $F_{1,1}$, $F_{2,1}$ and $F_{3,1}$, each in the first column of the switching matrix. In FIG. 2 optical beams linearly polarized in the first selected direction are represented by a double headed arrow, whereas optical beams linearly polarized in the second selected direction are represented by a solid dot. For purposes of explanation of operation, it will be assumed that each optical beam being applied to the matrix is linearly polarized in the first selected orientation and that each SLM of switching cells $S_{1,2}$, $S_{2,3}$ and $S_{3,1}$ receives a control signal selected to rotate the polarization orientation of light passing therethrough by 90°, while each SLM of all remaining switching cells receives a control signal selected not to rotate the polarization orientation of light passing therethrough.

In accordance with the aforementioned selected settings, optical beam $K_1$ emerges from first SLM $F_{1,1}$ maintaining the first selected polarization orientation and thus beamsplitter $B_{1,1}$ permits beam $K_1$ to pass through undeflected toward cell $S_{1,2}$ located in the subsequent column $C_2$. Beam $K_1$ is directly received by first SLM $F_{1,2}$ of cell $S_{1,2}$. Since SLM $F_{1,2}$ is selected to rotate the linear polarization of light passing therethrough by an angle of 90°, beam $K_1$ emerges therefrom having the second polarization orientation and thus beamsplitter $B_{1,2}$ deflects beam $K_1$ by an angle of 90° toward second SLM $D_{1,2}$. In accordance with the selected setting for second SLM $D_{1,2}$, beam $K_1$ emerges therefrom with the first polarization orientation. Since beam $K_1$, once again, has the first selected polarization orientation, beam $K_1$ passes undeflected through beamsplitter $B_{2,2}$ and continues on to the subsequent switching cell $S_{3,2}$. Since the SLMs in switching cell $S_{3,2}$ are selected not to rotate the polarization orientation of light passing therethrough, beam $K_1$ passes undeflected through beamsplitter $B_{3,2}$ and through second SLM $D_{3,2}$ to a selected output port (e.g., $L_5$). Again referring to FIG. 2, analysis analogous to the one described in reference to beam $K_1$ indicates that optical beams $K_5$ and $K_9$ propagate through the switching matrix so that beams $K_5$ and $K_9$ respectively reach selected output ports (e.g., $L_9$ and $L_1$).

Figure 3:
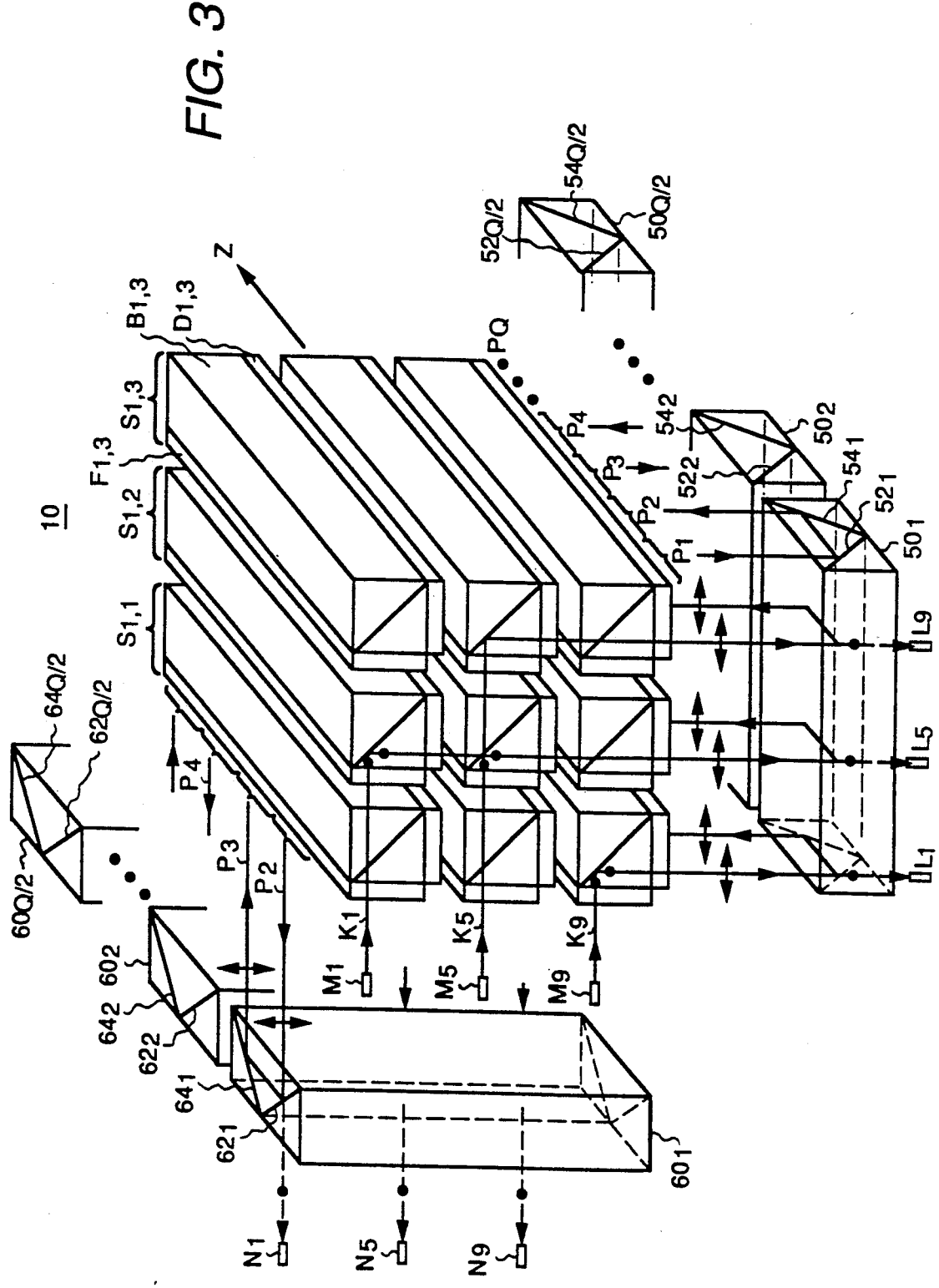
FIG. 3 is a schematic perspective view of another embodiment in accordance with the present invention.

Referring now to FIG. 3, there is illustrated a switching device 10 which comprises a succession of stacked switching matrices identified by alternate odd and even numbers (e.g., $P_1$, $P_2$, $P_3$ ... $P_Q$). In general device 10 comprises a plurality of Q matrices substantially similar to the one illustrated and described in the context of FIGS. 1 and 2. Each of the Q matrices is positioned in parallel alignment with each other across a common axis perpendicular to their rows and columns (e.g. the Z axis extending into the plane of the figure). As illustrated in FIG. 3, respective optical components of successive switching cells $S_{i,j}$ in each of the Q switching matrices may be constructed integral to each other. Thus, polarizing beamsplitters $B_{i,j}$ located in the same ith row and jth column of successive matrices ($P_1$, $P_2$ ... $P_Q$) may be formed by a single elongated polarizing beamsplitter piece extending parallel to the Z axis (e.g., polarizing beamsplitter $B_{1,3}$). A similar integral construction may also be provided for each of the SLMs of successive switching cells $S_{i,j}$ (e.g., first SLM $F_{1,3}$ and second SLM $D_{1,3}$). This integral construction reduces manufacturing costs as well as optical misalignment between each successive switching cell. FIG. 3 further illustrates row reflecting means $50_1$, $50_2$ ... $50_{Q/2}$ each capable of optically coupling an associated pair of consecutive switching matrices in which an odd matrix is followed by an even matrix. For example, row reflecting means $50_1$ is capable of optically coupling switching matrix $P_1$ to matrix $P_2$. Each row reflecting means comprises a first row end polarizing beamsplitter (e.g., $52_1$, $52_2$ ... $52_{Q/2}$) and a second row end polarizing beamsplitter ($54_1$, $54_2$ ... $54_{Q/2}$). Each first row end polarizing beamsplitter is optically coupled to receive optical beams from the last row of an associated odd matrix and is optically coupled to transmit optical beams received with the first selected polarization orientation to the second row end polarizing beamsplitter and to transmit optical beams received with the second polarization orientation to output ports associated with the row reflecting means. The second row end polarizing beamsplitter is optically coupled to redirect the optical beams received from the first row end polarizing beamsplitter into the last row of the subsequent even matrix. For example, referring again to row reflecting means $50_1$, its first row end polarizing beamsplitter $52_1$ is optically coupled to receive optical beams from the last row of matrix $P_1$ and as indicated in FIG. 3 optical beams received with the first selected polarization orientation, in cooperation with its second row end polarizing beamsplitter $54_1$, are redirected into the last row of the subsequent even matrix $P_2$ for further propagation within matrix $P_2$. Conversely, optical beams received with the second selected polarization orientation pass undeflected through first row end polarizing beamsplitter $52_1$ toward output ports associated with row reflecting means $50_1$ (e.g., $L_1$, $L_5$ and $L_9$).

FIG. 3 also illustrates column reflecting means $60_1$, $60_2$ ... $60_{Q/2}$ each capable of optically coupling an associated pair of consecutive switching matrices in which an even matrix is followed by an odd matrix. For example, column reflecting means $60_1$ is capable of optically coupling switching matrix $P_2$ to matrix $P_3$. Each column reflecting means comprises a pair of column end polarizing beamsplitters one of which ($62_1$, $62_2$ ... $62_{Q/2}$) is optically coupled to receive optical beams from the first column of an associated even matrix and optically coupled to transmit optical beams received with the first selected polarization orientation to the other column end polarizing beamsplitter ($64_1$, $64_2$ ... $64_{Q/2}$) and to transmit optical beams received with the second selected polarization orientation to output ports associated with the column reflecting means (e.g., $N_1$ $N_5$ and $N_9$). The other column end polarizing beamsplitter ($64_1$, $64_2$ ... $64_{Q/2}$) of each column reflecting means is optically coupled to redirect the optical beams received from the one column end beamsplitter into the first column of the subsequent odd matrix. For example, referring again to column reflecting means $60_1$, column end polarizing beamsplitter $62_1$ is optically coupled to receive optical beams from the first column of matrix $P_2$ and as shown in FIG. 3 beams received with the first selected polarization, in cooperation with the other column end polarizing beamsplitter $64_1$, are redirected into the first column of the subsequent odd matrix $P_3$. In contrast, beams received with the second selected polarization orientation pass undeflected through column end polarizing beamsplitter $62_1$ toward output ports $N_1$, $N_5$, and $N_9$ associated with column reflecting means $60_1$.

In accordance with this embodiment, in each cell of an odd matrix the SLMs and polarizing beamsplitter cooperate to propagate optical beams through the odd matrix in ascending column order within a row and in ascending row order within a column, while in each cell of an even matrix the SLMs and polarizing beamsplitter cooperate to propagate signal beams through the even matrix in descending row order within a column and in descending column order within a row so that redirected optical beams may be switched to selected output ports.

In another aspect of the invention, the control signal applied to an individual pixel may be selected to an intermediate voltage level so as to rotate the polarization orientation of the optical beam passing therethrough by an angle of about 45°. A beamsplitter $B_{i,j}$ receiving an optical beam with the above mentioned 45° polarization orientation splits the received optical beam into two mutually orthogonal beams for further propagation within the switching matrix. In accordance with this aspect of the invention each of the externally derived optical beams can be simultaneously directed to at least two selected output ports of the switching matrix.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An optical switching device for simultaneously and individually directing a plurality of externally derived linearly polarized optical signal beams to a selected plurality of output ports of said device, said device comprising:
   a first switching matrix comprising a plurality M×N of switching cells arranged in M columns and N rows of said cells;
   each of said switching cells comprising first and second spatial light modulators positioned at an angle to each other for operating on optical beams passed by said cell;
   each of said spatial light modulators including an array of individually controllable pixels patterned such that corresponding pixels in a row of cells are aligned with each other along said row and corresponding pixels in a column of cells are aligned with each other along said column;
   each first spatial light modulator of a cell in the first column of said matrix being positioned to receive a portion of said plurality of externally derived optical beams such that each pixel thereof receives a respective one of said optical beams;
   each first spatial light modulator in cell columns of said matrix subsequent to said first column being positioned to directly receive optical beams from a cell located in a preceding column of the same row;
   means for individually receiving and applying control signals to the pixels of each of said first and second spatial light modulators capable of rotating the polarization orientation of the received optical beam through and up to at least 90°; and
   each of said cells further comprising a polarizing beamsplitter optically coupled to receive optical beams from the first spatial light modulator thereof and from the second spatial light modulator of a cell located in a preceding row of the same column, said beamsplitter permitting optical beams received with a first selected linear polarization orientation to pass therethrough undeflected, but causing signal beams received with a second selected linear polarization orientation to be deflected at an angle;
   whereby externally derived optical signal beams applied simultaneously to said first cell column can propagate through said matrix under the direction of said control signals so as to reach said selected output ports without mutual interference.

2. An optical switching device according to claim 1, wherein the polarizing beamsplitter of each of said switching cells is capable of splitting each received optical beam, according to its polarization orientation, into two mutually orthogonal beams for further propagation within said matrix;
   whereby each externally derived optical signal beam can be simultaneously directed to at least two selected output ports of said matrix.

3. An optical switching device according to claim 1, wherein each pixel array in the cells of said first switching matrix is associated with a respective array of focusing lenses disposed so that each of said lenses is optically coupled to a respective one of said pixels.

4. An optical switching device according to claim 3, wherein the polarizing beamsplitter of each of said switching cells is capable of splitting each received optical beam, according to its polarization orientation, into two mutually orthogonal beams for further propagation within said matrix;
   whereby each externally derived optical signal beam can be simultaneously directed to at least two selected output ports of said matrix.

5. An optical switching device according to claim 1, wherein said device comprises a succession of additional switching matrices substantially identical to said first switching matrix, said first matrix and said additional matrices comprising stacked matrices identified by alternate odd and even numbers, said stacked matrices being positioned in parallel alignment with each other across a common axis perpendicular to the rows and columns of said stacked matrices.

6. An optical switching device according to claim 5, wherein each pixel array in the cells of said stacked switching matrices is associated with a respective array of focusing lenses disposed so that each of said lenses is optically coupled to a respective one of said pixels.

7. An optical switching device according to claim 6 and further comprising row reflecting means capable of optically coupling each pair of consecutive stacked matrices in which an odd matrix is followed by an even matrix;
   each of said row reflecting means comprising first and second row end polarizing beamsplitters, said first row end polarizing beamsplitter optically coupled to receive optical beams from the last row cell of said odd matrix and optically coupled to deflect optical beams received with said first selected polarization orientation to said second row end polarizing beamsplitter and to pass optical beams received with said second selected polarization orientation to output ports associated with said row reflecting means, said second row end polarizing beamsplitter optically coupled to redirect optical beams received from said first row end polarizing beamsplitter into the last row cell of the next subsequent even matrix for further propagation within said subsequent even matrix;

whereby redirected optical beams may be switched to selected output ports by way of the cells located in said subsequent even matrix.

8. An optical switching device according to claim 7 and further comprising column reflecting means capable of optically coupling each pair of consecutive stacked matrices in which an even matrix is followed by an odd matrix;

each of said column reflecting means comprising a pair of column end polarizing beamsplitters, one of said column end polarizing beamsplitters optically coupled to receive optical beams from the first column cell of said even matrix and optically coupled to deflect optical beams received with said first selected polarization orientation to the other of said column end polarizing beamsplitters and to pass optical beams received with said second polarization orientation to output ports associated with said column reflecting means, said other of said column end polarizing beamsplitters optically coupled to redirect optical beams received from said one column end polarizing beamsplitter into the first column cell of the next subsequent odd matrix for further propagation within said subsequent odd matrix;

whereby in each cell of a predetermined odd matrix the spatial light modulators and the polarizing beamsplitter cooperate to propagate optical beams through said predetermined odd matrix in ascending column order within a row and in ascending row order within a column, and in each cell of a predetermined even matrix the spatial light modulators and the polarizing beamsplitter cooperate to propagate optical beams through said predetermined even matrix in descending row order within a column and in descending column order within a row.

9. An optical switching device according to claim 5, wherein each beamsplitter of cells identically located in each of said stacked matrices is integral to each other so as to form an elongated beamsplitter extending substantially parallel to said common axis.

10. An optical switching device according to claim 9, wherein each first spatial light modulator of cells identically located in each of said stacked matrices is integral to each other so as to form an elongated first spatial light modulator extending substantially parallel to said common axis.

11. An optical switching device according to claim 10, wherein each second spatial light modulator of cells identically located in each of said stacked matrices is integral to each other so as to form an elongated second spatial light modulator extending substantially parallel to said common axis.

12. An optical switching device according to claim 11, wherein each pixel array in the cells of said stacked switching matrices is associated with a respective array of focusing lenses disposed so that each of said lenses is optically coupled to a respective one of said pixels.

13. An optical switching device for simultaneously and individually directing a plurality of externally derived linearly polarized optical signal beams to a selected plurality of output ports of said device, said device comprising:

a switching matrix comprising a plurality $M \times N$ of switching cells arranged in M columns and N rows of said cells;

each of said switching cells comprising first and second spatial light modulators positioned at an angle to each other for operating on optical beams received or transmitted by said cell;

each of said spatial light modulators including an array of individually controllable pixels patterned so that corresponding pixels in a row of cells are aligned with each other along said row and corresponding pixels in a column of cells are aligned with each other along said column;

each first spatial light modulator of a cell in the first column of said matrix and each second spatial light modulator of a cell in the last row of said matrix being positioned to receive respective portions of said plurality of externally derived optical beams or to pass optical beams from within said matrix to said output ports;

each first spatial light modulator in a column of said matrix subsequent to said first column being positioned to directly receive or to pass optical beams with respect to a cell located in a preceding column of the same row;

each second spatial light modulator in a predetermined row preceding said last row being positioned to directly receive or to pass optical beams with respect to a cell located in a row subsequent to said predetermined row of the same column;

means for individually applying control signals to the pixels of each of said first and second spatial light modulators capable of rotating the polarization orientation of the received optical beam; and each of said cells further comprising a polarizing beamsplitter optically coupled to receive optical beams from the first spatial light modulator of the same cell and from the second spatial light modulator of a cell located in a preceding row of the same column, and optically coupled to receive optical beams from the second spatial light modulator of the same cell and from the first spatial light modulator of a cell located in the subsequent column of the same row, said polarizing beamsplitter permitting optical beams received with a first selected linear polarization orientation to pass therethrough undeflected, but causing optical beams received with a second selected linear polarization orientation to be deflected by an angle;

whereby externally derived optical signal beams applied simultaneously to said first cell column or to said last cell row can propagate through said matrix under the direction of said control signals so as to reach said selected plurality of output ports without mutual interference.

14. An optical switching device according to claim 13, wherein the polarizing beamsplitter of each of said switching cells is capable of splitting each received optical beam, according to its polarization orientation, into two mutually orthogonal beams for further propagation within said matrix;

whereby each externally derived optical signal beam can be simultaneously directed to at least two selected output ports of said matrix.

15. An optical switching device according to claim 14, wherein each pixel array in the cells of said matrix is associated with a respective array of focusing lenses disposed so that each of said lenses is optically coupled to a respective one of said pixels.

16. An optical switching device according to claim 15, wherein the polarizing beamsplitter of each of said switching cells is capable of splitting each received optical beam, according to its polarization orientation, into two mutually orthogonal beams for further propagation within said matrix;

whereby each externally derived optical signal beam can be simultaneously directed to at least two selected output ports of said matrix.

* * * * *